(12) United States Patent
Pienkos

(10) Patent No.: US 7,819,315 B1
(45) Date of Patent: Oct. 26, 2010

(54) APPARATUS AND METHOD FOR PROVIDING PRODUCT LOCATION INFORMATION TO CUSTOMERS IN A STORE

(75) Inventor: John Thaddeus Pienkos, Milwaukee, WI (US)

(73) Assignee: Innovaport LLC, Milwaukee, WI (US)

( * ) Notice: Subject to any disclaimer, the term of this patent is extended or adjusted under 35 U.S.C. 154(b) by 288 days.

(21) Appl. No.: 11/707,842

(22) Filed: Feb. 19, 2007

Related U.S. Application Data

(63) Continuation of application No. 09/626,365, filed on Jul. 23, 2000, now Pat. No. 7,231,380.

(60) Provisional application No. 60/158,444, filed on Oct. 9, 1999.

(51) Int. Cl.
*G06Q 30/00* (2006.01)

(52) U.S. Cl. .................. 235/383; 700/94; 704/275; 705/22; 705/28; 707/948; 235/385

(58) Field of Classification Search .............. 705/22, 705/28; 235/375, 383, 385, 376; 340/825.25; 379/88.18, 88.22, 88.23; 700/115, 94; 704/270.1, 704/275; 707/1, 3, 10, 100, 200, 944, 948, 707/949, 999.003
See application file for complete search history.

(56) References Cited

U.S. PATENT DOCUMENTS

| | | | | |
|---|---|---|---|---|
| 3,961,163 A * | 6/1976 | Stevenson, III | ............. | 365/244 |
| 4,521,677 A * | 6/1985 | Sarwin | ......................... | 235/385 |
| 4,531,311 A * | 7/1985 | Howard et al. | ................ | 40/649 |
| 4,817,043 A * | 3/1989 | Brown | ......................... | 715/810 |
| 4,831,367 A * | 5/1989 | Baus | ........................... | 345/168 |
| 4,920,488 A * | 4/1990 | Filley | ........................... | 705/28 |
| 5,047,614 A * | 9/1991 | Bianco | ........................ | 235/385 |
| 5,127,674 A * | 7/1992 | Lamphere et al. | ............. | 283/37 |
| 5,215,213 A * | 6/1993 | Nestler et al. | ................ | 221/129 |
| 5,241,657 A * | 8/1993 | Fine et al. | .................... | 345/501 |
| 5,349,678 A * | 9/1994 | Morris et al. | ............... | 709/219 |
| 5,401,947 A * | 3/1995 | Poland | ........................ | 235/383 |
| 5,448,696 A * | 9/1995 | Shimada et al. | ............. | 715/853 |
| 5,568,645 A * | 10/1996 | Morris et al. | ................ | 709/203 |
| 5,572,015 A * | 11/1996 | Bird et al. | ................. | 250/208.1 |
| 5,572,653 A * | 11/1996 | DeTemple et al. | .......... | 345/501 |

(Continued)

OTHER PUBLICATIONS

Allison Galosich, "Techno-tracking", National Provisioner. Northbrook, May 1998, vol. 212, Iss. 5, p. 74, 3 pgs.*

(Continued)

*Primary Examiner*—Andrew Joseph Rudy

(57) ABSTRACT

A system and method are disclosed for providing product location information within a store. The system comprises a first user interface fixed within the store and an inventory information unit coupled to the first user interface. The first user interface is configured to receive an input signal from a user related to the identity of a product within the store, to process the input signal and to provide a product inquiry signal in response to the input signal. The first user interface is further configured to receive a location information signal, and to provide an output signal in response to the location information signal. The inventory information unit comprises a database containing product location information and is configured to provide the location information signal to the first user interface after receiving the product inquiry signal from the first user interface.

20 Claims, 4 Drawing Sheets

U.S. PATENT DOCUMENTS

| | | | | |
|---|---|---|---|---|
| 5,630,068 A | * | 5/1997 | Vela et al. | 705/323 |
| 5,640,002 A | * | 6/1997 | Ruppert et al. | 235/462.46 |
| 5,671,436 A | * | 9/1997 | Morris et al. | 1/1 |
| 5,697,061 A | * | 12/1997 | Krueger et al. | 455/39 |
| 5,765,142 A | * | 6/1998 | Allred et al. | 705/26 |
| 5,771,003 A | * | 6/1998 | Seymour | 340/572.1 |
| 5,859,414 A | * | 1/1999 | Grimes et al. | 235/383 |
| 5,872,850 A | * | 2/1999 | Klein et al. | 705/51 |
| 5,887,271 A | * | 3/1999 | Powell | 705/14.1 |
| 5,890,135 A | * | 3/1999 | Powell | 235/383 |
| 5,895,454 A | * | 4/1999 | Harrington | 705/26 |
| 5,950,173 A | * | 9/1999 | Perkowski | 705/26 |
| 5,963,948 A | * | 10/1999 | Shilcrat | 1/1 |
| 5,967,343 A | * | 10/1999 | Dufresne | 211/86.01 |
| 5,979,757 A | * | 11/1999 | Tracy et al. | 235/383 |
| 5,987,499 A | * | 11/1999 | Morris et al. | 709/203 |
| 5,991,726 A | * | 11/1999 | Immarco et al. | 704/270 |
| 5,995,015 A | * | 11/1999 | DeTemple et al. | 340/825.49 |
| 6,000,610 A | * | 12/1999 | Talbott et al. | 235/383 |
| 6,016,481 A | * | 1/2000 | Failing et al. | 705/28 |
| 6,061,646 A | * | 5/2000 | Martino et al. | 704/3 |
| 6,076,071 A | * | 6/2000 | Freeny, Jr. | 705/26 |
| 6,091,956 A | * | 7/2000 | Hollenberg | 455/456.5 |
| 6,101,483 A | * | 8/2000 | Petrovich et al. | 705/26 |
| 6,112,206 A | * | 8/2000 | Morris et al. | 1/1 |
| 6,112,523 A | * | 9/2000 | Kamo et al. | 60/612 |
| 6,119,101 A | * | 9/2000 | Peckover | 705/26 |
| 6,122,523 A | * | 9/2000 | Zicker et al. | 455/551 |
| 6,125,353 A | * | 9/2000 | Yagasaki | 705/27 |
| 6,129,274 A | * | 10/2000 | Suzuki | 235/381 |
| 6,129,276 A | * | 10/2000 | Jelen et al. | 235/383 |
| 6,144,848 A | * | 11/2000 | Walsh et al. | 455/419 |
| 6,230,199 B1 | * | 5/2001 | Revashetti et al. | 709/224 |
| 6,250,006 B1 | * | 6/2001 | Berrier | 40/666 |
| 6,354,493 B1 | * | 3/2002 | Mon | 235/380 |
| 6,381,583 B1 | * | 4/2002 | Kenney | 705/26 |
| 6,430,554 B1 | * | 8/2002 | Rothschild | 1/1 |
| 6,434,530 B1 | * | 8/2002 | Sloane et al. | 705/26 |
| 6,442,530 B1 | * | 8/2002 | Miller | 705/16 |
| 6,533,173 B2 | * | 3/2003 | Benyak | 235/383 |
| 6,539,269 B1 | * | 3/2003 | Jarrow et al. | 700/83 |
| 6,543,684 B1 | * | 4/2003 | White et al. | 235/379 |
| 6,552,663 B2 | * | 4/2003 | Swartzel et al. | 340/572.1 |
| 6,556,840 B2 | * | 4/2003 | Zicker et al. | 455/551 |
| 6,587,835 B1 | * | 7/2003 | Treyz et al. | 705/14.64 |
| 6,625,581 B1 | * | 9/2003 | Perkowski | 705/27 |
| 6,644,547 B1 | * | 11/2003 | White | 235/381 |
| 6,694,359 B1 | * | 2/2004 | Morris et al. | 709/219 |
| 6,974,078 B1 | * | 12/2005 | Simon | 235/383 |
| 7,146,156 B2 | * | 12/2006 | Zicker et al. | 455/411 |
| 7,228,282 B1 | * | 6/2007 | Philyaw et al. | 705/1 |
| 7,231,380 B1 | * | 6/2007 | Pienkos | 707/3 |
| 7,565,308 B1 | * | 7/2009 | Bollay | 705/26 |
| 2009/0012704 A1 | | 1/2009 | Franco et al. | |

OTHER PUBLICATIONS

Web Pages From Website of Marcole Interactive Systems, www.marcole.com, Printed on May 20, 2005, 74 Pages.*

"Frustrated Shoppers Turn to GPS", Oddly Enough—Reuters, Yahoo! News, Apr. 30, 2003, printed on May 17, 2003, 2 Pages.*

Web pages concerning Symbol Technologies and Telxon Corporation, obtained at website of Symbol Technologies, www.symbol.com, printed on May 17, 2003, 72 Pages.*

* cited by examiner

APPARATUS AND METHOD FOR PROVIDING PRODUCT LOCATION INFORMATION TO CUSTOMERS IN A STORE

CROSS-REFERENCE TO RELATED APPLICATION

This application is a continuation of U.S. patent application Ser. No. 09/626,365 entitled "APPARATUS AND METHOD FOR PROVIDING PRODUCT LOCATION INFORMATION TO CUSTOMERS IN A STORE" filed on Jul. 23, 2000 now U.S. Pat. No. 7,231,380, which is based upon U.S. Provisional Application No. 60/158,444 filed Oct. 9, 1999 having the same title, claims the benefit of both of these applications, and hereby incorporates by reference herein both patent applications.

FIELD OF THE INVENTION

The present invention relates to an apparatus and method for providing product location information to customers (or employees or others) in stores and other retail centers.

BACKGROUND OF THE INVENTION

The number and variety of different products being sold in stores has increased and continues to increase at a rapid pace. This abundance of different products is a result not only of increased demand on the part of consumers and the development of more and more specialized products on the part of manufacturers, but also of the emergence of enormous warehouse-type stores in which retailers attempt to provide every imaginable product (within broadly-defined product areas) to consumers. Because of this huge increase in the number of available products being sold in an individual store, shopping has become a frustrating experience for many shoppers. Instead of being able to quickly find the products in the stores that they are interested in purchasing, shoppers often must seek the proverbial "needle in the haystack" when searching for desired products or else must walk through every aisle of the store in order to guarantee that they are not missing the products that they desire.

Of course, modern stores typically do have a variety of displays or signs posted throughout the store that direct customers (at least in a general fashion) towards particular types of goods. Such signs are often hung from the ceilings of the stores or posted at the ends of aisles. However, in many cases such signs are not an adequate mechanism for providing customers with sufficient information to allow them to easily find the products for which they are searching. Not only are the signs sometimes difficult to read, but also the signs are limited in that only a small amount of information can be fit onto the signs.

Consequently, shoppers often resort to a common fallback-asking an employee of the store to direct them to the products they are looking for. Such behavior, while often allowing shoppers to find the desired products within a store, has significant disadvantages. First, store employees are not always able to provide clear instructions and, indeed, frequently do not themselves know where various products are located. As a result, shoppers who decide to ask store employees for directions often must ask more than one employee for such directions.

More importantly, a constant barrage of product location questions to employees from shoppers invariably detracts from the employees' productivity. Not only are the employees distracted from the work they are otherwise performing, but also answering questions can significantly detract from the time the employees actually are performing their work, particularly since the employees often physically walk with the shoppers to the location of the products to help the shoppers find what they are looking for. Employees often must accompany the shoppers simply because the employees themselves are not exactly sure of the precise location of the products in question.

While both customers and many employees of a store often are not fully aware of the locations within the store of the various products being sold by the store, this is typically not because the information is not available. A store typically has one or more managers or other employees who are in charge of maintaining inventory within the store, and who consequently know the locations of most, if not all, of the products within the store. Moreover, many modern stores have a computerized or other information system that is utilized to keep track of the stores' inventory. Such inventory systems can keep track of, in addition to the types and brands of products being sold, the vendors of the products being sold, the prices for which the products are being bought and sold by the store, the number of each type of product that is remaining within the store and even the locations of the various products within the store.

U.S. Pat. No. 5,630,068 shows one system that has already been designed to assist customers and others in locating products within stores. According to this system, customers in a store are provided with relay units that are either mounted on shopping carts that the customers push around within the store, or simply carried around the store by the customers. The relay units are coupled to a central computer by way of light or radio frequency (RF) signals. When the customers begin shopping, they identify from a list those products that they are interested in purchasing. Upon finishing this entry of information, the customers are provided with graphical and other information indicating the location of the desired products within the store and, as they progress through the store, are provided with prompts/reminders when they approach the locations of the products that were originally indicated.

Although this known system is capable of providing product location information to customers, the system has several drawbacks. The optical, RF and/or sensor equipment required by the system for allowing communication between the central computer and the relay units, for determining the positions of relay units, and for determining when the relay units are approaching the locations of products that have been selected by the customers, is complicated. Because the relay units are mobile, the relay units can be lost or damaged by customers. Indeed, relay units that are coupled to shopping carts can be damaged as a result of a variety of circumstances, including exposure to the elements when shopping carts are left outside of the store. For these reasons, the known system may be undesirably complicated and expensive.

From the above, it is apparent that it would be advantageous if stores had systems within the stores for providing product location information to customers (or employees or others). It would further be advantageous if these systems were easily accessed by customers and provided information in a rapid and convenient manner. It would be particularly advantageous if access were facilitated by employing a system with user interfaces that were conveniently accessible by customers from a number of locations within a given store.

It would also be particularly advantageous if access was facilitated by employing a system having user interfaces that made use of modern electronic interface technologies. At the same time, it would further be advantageous if the system utilized a simple array of electronic technologies so that the system could be inexpensively installed within stores and was robust and easily maintained. It would be particularly advantageous if the system were interconnected with existing (or new or modified) computerized or other information systems within stores whereby existing inventory information could be easily obtained and relayed to customers.

SUMMARY OF THE INVENTION

The present invention relates to a system for providing product location information within a store. The system comprises a first user interface fixed within the store and an inventory information unit coupled to the first user interface. The first user interface is configured to receive an input signal from a user related to the identity of a product within the store, to process the input signal and to provide a product inquiry signal in response to the input signal. The first user interface is further configured to receive a location information signal, and to provide an output signal in response to the location information signal. The inventory information unit comprises a database containing product location information and is configured to provide the location information signal to the first user interface after receiving the product inquiry signal from the first user interface.

The present invention additionally relates to a system for providing product location information within a store, which includes an information unit and an input/output device. The information unit includes processing circuitry and a database containing product location information, and is configured to receive an input signal, to process the input signal, to obtain product location information from the database in response to the processed input signal, and to provide an output signal indicative of information regarding product location. The input/output device is fixed at a location within the store, and is configured to receive a user input concerning a product location inquiry and to provide the input signal to the information unit in response to the user input. The input/output device is further configured to receive the output signal from the information unit and to communicate a user output in response to the output signal, where the user output is indicative of product location.

The present invention further relates to a system for providing product location information within a store that includes an input means, a signal processing means, a data storage means, and an output means. The input means is for receiving an input signal. The signal processing means is for processing the input signal to generate a product inquiry signal and is coupled to the input means. The data storage means is for storing product location information and providing a product location information signal to the signal processing means in response to the product inquiry signal. The data storage means is coupled to the signal processing means. The output means is for providing an output signal, and also is coupled to the signal processing means. The output means generates the output signal in response to a command signal from the signal processing means, which generates the command signal in response to the product location information signal.

The present invention additionally relates to a method of providing product location information within a store. The method comprises the step of affixing at least a first input device at a first location within the store. The method further comprises the steps of obtaining a product location inquiry at the first input device, processing the product location inquiry at a signal processing device to determine a product location inquiry signal, and querying a database to obtain product location information in response to the product location inquiry signal. The method also comprises the steps of providing a product location information signal in response to the product location inquiry signal and providing an output signal at an output device, the output signal being a response to the product location inquiry.

DETAILED DESCRIPTION OF THE DRAWINGS

Figure 1:
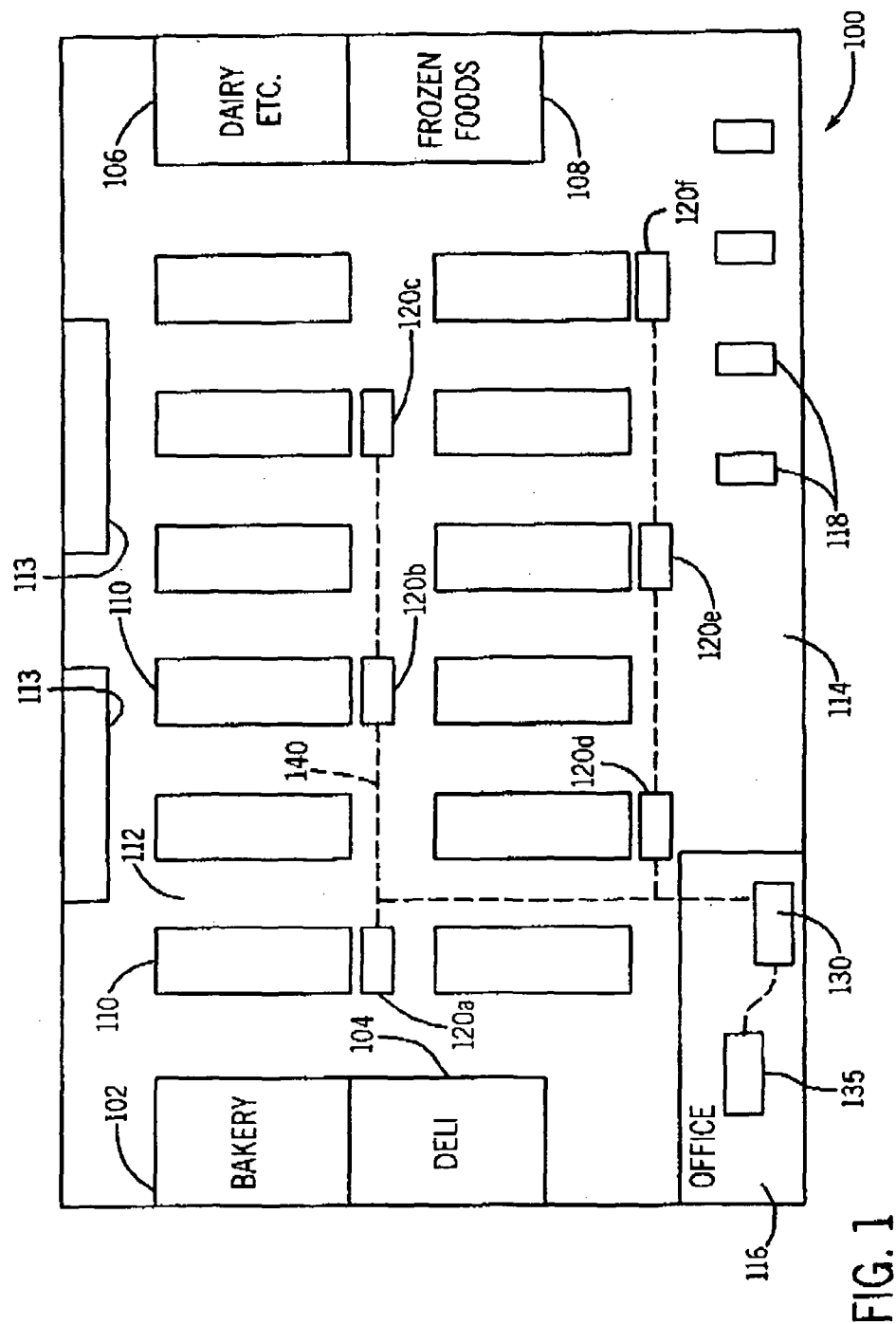
FIG. 1 shows a plan view of an exemplary store in which the invention is being utilized.

Referring to FIG. 1, an exemplary store 100 is shown in which the present invention is deployed. As shown, store 100 is a food store (e.g., "Pick 'n Save") with various specialty food centers, such as a bakery 102, a deli 104, a dairy section 106 and a frozen foods section 108. The store layout includes a number of different shelves 110, racks (not shown), aisles 112, refrigeration compartments 113, and check-out counters 118 and may include more than one room, such as a main shopping room 114 and an office 116. Items that may be purchased by consumers, or which may for some other reason be of interest to consumers, are at different locations within the store. While the store may be organized in order to facilitate customers' searches for desired items, customers still must look around and walk around the store to find various items.

While a food store 100 is shown, the present invention is applicable to all other types of stores that sell more than one item (or have more than one item of interest to customers) and have such items located in different positions within the store. For example, in addition to food stores, the present invention can be employed in a pharmacy/drug store (e.g. Walgreen's™), a home-improvement store (e.g., Home Depot™), an office merchandise store (e.g., Office Depot™), a department store (e.g., Marshall Field's™), and virtually all other stores.

Referring to FIG. 1, in a preferred embodiment multiple user interfaces 120 (specifically, user interfaces 120a-120f) are positioned at multiple locations within the store (in an alternate embodiment, a store would have only one such user interface positioned at one location). Each of user interfaces 120 is capable of receiving inquiries from customers (or employees or others) as to the location of various items within store 100. Also, each of user interfaces 120 is capable of providing information to customers in response to receiving inquiries from the customers.

In the preferred embodiment, each of user interfaces 120 is capable of providing information regarding the location of any item of interest to customers within store 100 (as well as capable of indicating to customers that a particular item does not exist within the store if customers inquire as to the location of that item). In alternative embodiments, some (e.g., one or more) of user interfaces 120 are able to provide more information than some of the other user interfaces. Indeed, in certain alternative embodiments, one or more of user interfaces 120 are capable of providing completely different information than one or more of the other user interfaces.

As shown in FIG. 1, in the preferred embodiment, each of user interfaces 120 is connected to a central hub 130. User interfaces 120 can be, but need not be, coupled to one another as well as coupled individually to central hub 130. The exact connection matrix between user interfaces 120 and central hub 130 is not of significant concern. For example, some (or all) of user interfaces 120 can be connected to one another and to central hub 130 in serial fashion, as are user interfaces 120*d*-120*f* in FIG. 1. Alternatively (or in addition), some (or all) of user interfaces 120 can be connected in the form of a wheel with a hub and spokes, as are user interfaces 120*a*, 120*b* and 120*d* with respect to central hub 130 in FIG. 1. Coupling (as shown by a dashed line 140 in FIG. 1) of user interfaces 120 to central hub 130 and/or to one another is preferably by way of electrical wiring in order to be relatively inexpensive although, in alternate embodiments, the coupling can occur by way of wireless communications or some other communication mechanism.

Central hub 130 is, in the preferred embodiment, a central computer database (or other information source) in which information regarding the location of all or at least some of the items within store 100 (i.e., inventory location information) is stored. The product location information can include information as to where products are both placed or stored. In addition to this product location information stored in central hub 130 is a variety of types of additional information regarding products or other store features (e.g., information regarding the current stock of different items and prices of different items).

The location information (and any other information) within central hub 130 can be provided to the central hub in a variety of ways. In the preferred embodiment (and as shown in FIG. 1), the information is provided to central hub 130 from an overall inventory database 135 of the store, such as currently exist in many stores today, with which the central hub is configured (and programmed) to communicate. In an alternate embodiment, central hub 130 is the only database containing inventory information within the store, and is programmed with inventory information including product location information by store personnel-(or by some other automatic system).

Operation of user interfaces 120 in relation to central hub 130 can take different forms according to different embodiments. In a first embodiment, each of user interfaces 120 is configured to send a signal to central hub 130 to access the database, upon receipt of an inquiry from a customer regarding the location of a particular item. Upon accessing the database, information is obtained regarding the location of that particular item and provided back to the respective user interface 120, which in turn relays that information (or related information) to the inquiring customer.

The exact communications protocol between user interfaces 120 and central hub 130 can take the form of any of a number of standard communications protocols known to those skilled in the art. For example, in one embodiment a user interface 120 merely reports a request to central hub 130. Central hub 130 in turn receives the request, then (if it determines the request to be appropriate) performs a search of its database and finally, if relevant information is found, sends a message back to the respective user interface 120.

In a second embodiment, although each of user interfaces 120 is in communication with central hub 130, a given user interface does not need to access the central hub each time a customer makes a request. Rather, periodically all (or some) of the relevant location information within central hub 130 is downloaded into individual memories associated with each (or some) of user interfaces 120. Then, when a customer makes an inquiry at a particular user interface 120, the user interface accesses its own memory to obtain relevant information in response to the inquiry, instead of relaying the individual request to central hub 130 and obtaining relevant information in response to that request from the central hub.

This second embodiment is believed to be a preferred embodiment in relation to the first embodiment insofar as this second embodiment does not require effectively uninterrupted communications between user interfaces 120 and central hub 130 at all times and, further, does not place as great of a burden upon the potentially-limited processing capabilities of the central hub. At the same time, this second embodiment requires. greater memory storage capability on the part of each of user interfaces 120 to store the downloaded data from central hub 130.

Additional embodiments are also possible. For example, in certain embodiments, the user interfaces 120 are programmed by having one or more store employees (or other individuals) couple each user interface individually to central hub 130 only for the time necessary to download relevant information. In one embodiment, an employee can program the user interfaces 120 using a mobile device (not shown) that is carried around with the employee. The mobile device contains all of the relevant information and can be "plugged into" the different user interfaces 120, one by one, to download location information to the different user interfaces. The mobile device effectively functions as the "central hub" insofar as all product location information is transferred from it.

In further embodiments, some or all of user interfaces 120 are coupled only to certain other user interfaces such that, when one user interface is provided with information (e.g., when such user interface is connected to central hub 130 or to the mobile device discussed above), other user interfaces also receive that information. Indeed, in one embodiment, a user interface 120 is programmed to act as an "intermediate hub", such that location information is stored (or downloaded) onto that user interface but not others. In such a system, the other user interface(s) 120 that are connected to the intermediate hub user interface can request and obtain information from the intermediate hub in the same fashion as user interfaces would access central hub 130 in the first embodiment described above. (Referring to FIG. 1, for example, user interface 120*b* could be programmed to act as an intermediate hub with respect to user interface 120*c*.)

Figure 2B:
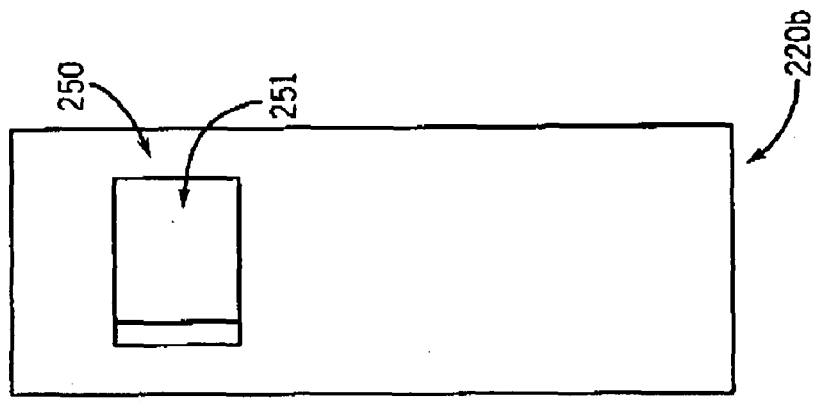
FIGS. 2a and 2b are front elevation views of two exemplary user interfaces at which persons desiring product location information may obtain such information.
Figure 2A:
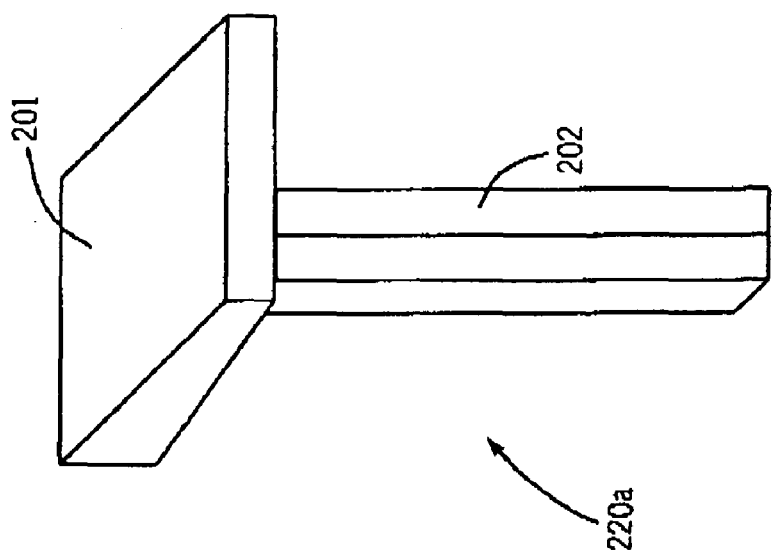

Referring to FIGS. 2*a* and 2*b*, two physical embodiments of exemplary user interfaces 220*a*, 220*b* are shown that are positionable at various, multiple locations in a store. User interface 220*a* shown in FIG. 2*a* has a user interface terminal 201 mounted upon a stand 202. Because user interface 220*a* is a stand-alone user interface, the user interface is positionable at various locations around the store, including at the ends of aisles, in between shelves, in the middle of aisles, at the front of the checkout counters, or along walls or at virtually any other position within the store. In contrast, user interface 220*b* shown in FIG. 2*b* is a user interface that consists merely of a user interface terminal 251. While user interface 220*b* is shown mounted on the end of a shelving structure (e.g., at the end of an aisle), the user interface can be mounted on walls, on other structures within or at the ends of aisles, at the front of checkout counters or at any of a variety of other convenient locations.

Preferably, user interface 220b is relatively thin so that the user interface does not protrude far off of the structure onto which the interface is mounted, and so that the user interface is not an obstruction to customers (and so that the user interface is not unaesthetic). In addition to exemplary user interfaces 220a, 220b, the present invention also encompasses a wide variety of alternate embodiments of user interfaces that are capable of receiving inquiries from customers and providing information in return. Such alternate embodiments of user interfaces include user interfaces of a different shape or size (including interfaces that are much smaller), user interfaces that form a part of some other structure in which the interfaces are embedded or integrated (e.g., a shelf), and user interfaces that have a different support mechanism (e.g., user interfaces suspended from the ceiling of the store).

The user interfaces also, in certain embodiments, are included within points of purchase displays, at which certain products are situated and/or promoted with advertisements. Insofar as the user interfaces are intended to be frequently accessed by customers, store owners are in some cases able to charge product manufacturers for the right to have their products situated next to, or in relatively close proximity to, the user interfaces. Indeed, in some cases, some of these product manufacturers are willing to subsidize the cost of installing the system of the present invention in exchange for the right to have their products specially situated near, or advertised by, the system.

Figure 3:
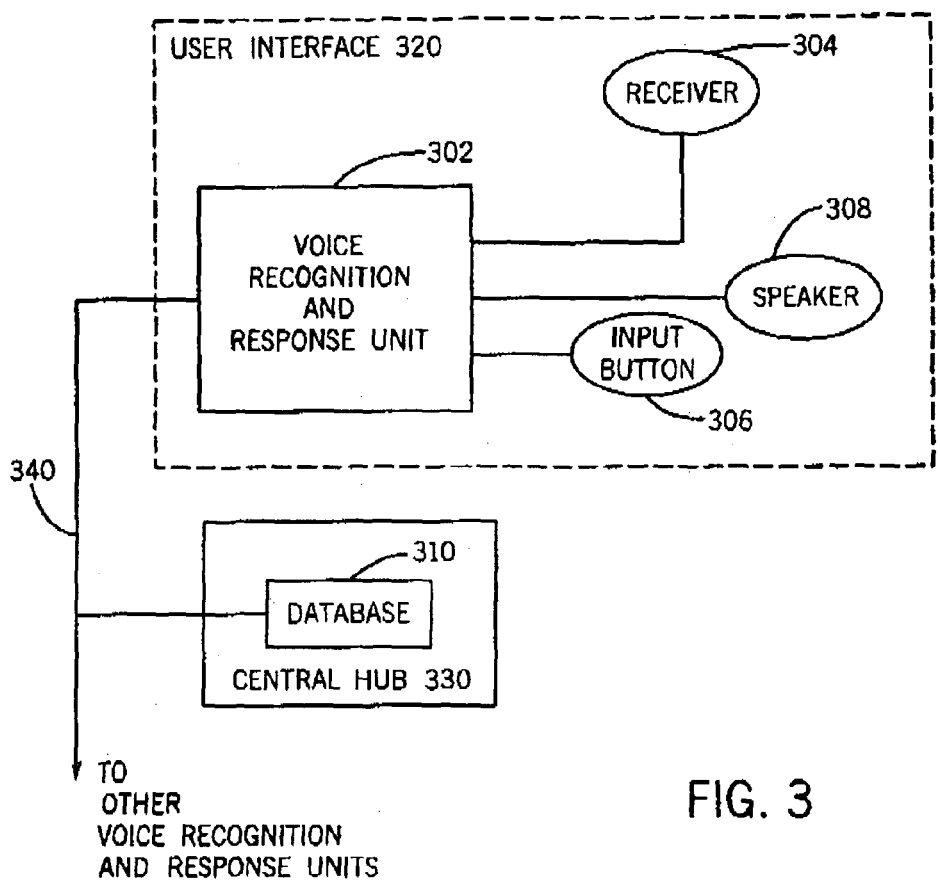
FIG. 3 is a block diagram showing elements of a preferred embodiment of the invention that utilizes voice recognition and voice response technology to interface with persons desiring location information.

Referring to FIG. 3, a block diagram showing elements of a preferred embodiment of the invention that utilizes voice recognition and voice response technology to interface with persons desiring location information is shown. The preferred embodiment includes a central hub 330 that is in communication with (at least from time to time) more than one user interface, one of which is shown as user interface 320, by way of an electrical communication link 340 (in an alternate embodiment, the central hub is only in communication with a single user interface). User interface 320 has a voice recognition and response unit 302 that receives voice input from a receiver 304.

A customer (or other person) can inquire about the location of a product by stating aloud the name of the product (or other similar characteristic information regarding the product) while the customer is in proximity to user interface 320, such that receiver 304 receives the voice inquiry and provides a signal indicative of the vocal inquiry to voice recognition and response unit 302. Voice recognition unit 302 in turn processes the signal from the receiver to determine the word or words that were stated by the customer. Any one of a number of voice recognition programs or circuits or other mechanisms known to those skilled in the art may be employed in voice recognition and response unit 302 to perform this voice recognition function. Typically, voice recognition and response unit 302 will include at least one microprocessor and significant storage memory.

Upon determining the words of the stated inquiry, voice recognition and response unit 302 then provides a signal to central hub 330 requesting information regarding the location of products signified by those words. Central hub 330 receives this request and then searches a database 310 within the central hub for relevant location information. Upon finding relevant location information in database 310, central hub 330 transmits the information via communication link 340 back to voice recognition and response unit 302. Voice recognition and response unit 302 in turn determines a speech-synthesis signal to be applied to speaker 308 in order to verbally communicate the relevant location information to the customer. Again, voice recognition and response unit 302 can employ known circuitry or software, in this case primarily speech-synthesizing circuitry, to determine the proper signal that should be sent to speaker 308.

While ideally this embodiment of the invention would be capable of recognizing all voice inquiries, rapidly obtaining product location information regarding those inquiries, and rapidly responding in verbal fashion to all of those inquiries, in practice this is sometimes not possible. For a variety of reasons, database 310 of central hub 330 sometimes does not have information regarding the location of a particular product. Not only may database 310 not be perfectly, accurately updated with all information concerning all products located within the store, but also voice recognition unit 302 may have difficulty in recognizing certain verbal requests (e.g., this may be the case where multiple products have highly-similar names). Further, customers may inquire about products that the store does not sell (e.g., a customer may inquire about bananas at Home Depot™).

In cases where voice recognition and response unit 302 is incapable of recognizing the words spoken by a customer, the voice recognition and response unit is configured to immediately (without sending a request signal to central hub 330) respond with a signal to speaker 308 indicating that the voice recognition and response unit does not recognize the requested product (e.g., the speaker states "I do not understand your request. Please restate your request"). Further, in cases where voice recognition and response unit 302 does recognize the requested words but, after providing the request signal to central hub 330, receives a signal from the central hub indicating that the central hub is unable to provide location information regarding the requested product, voice recognition and response unit 302 responds with a signal to speaker 308 indicating a similar message (e.g., "I do not have information regarding that product" or "Our store does not sell the product you requested").

In addition, while ideally user interface 320 is capable of determining that a customer is making an inquiry whenever a customer is in fact doing so, in practice the environment of a store often is sufficiently noisy that, without additional control mechanisms or programming, the user interface inappropriately responds to noise that does not constitute actual product location inquiries (for example, when announcements are made over a loudspeaker in a store, the announcement message is interpreted by the user interface to be a customer inquiry). Therefore, in the preferred embodiment, the customer first notifies user interface 320 that an inquiry is about to be made before making the inquiry by pressing an input button 306, which then relays an inquiry imminent signal to voice recognition and response unit 302.

Upon receiving the inquiry imminent signal, voice recognition and response unit 302 (which normally is in a latent state) then enters an active state in which it is ready to receive signals from receiver 304. The voice recognition and response unit can be configured to remain in such an active state for a predetermined period of time and then to return to the latent state. Not only does this feature reduce the difficulty of programming (or hardwiring) voice recognition and response unit 302 to recognize when an actual inquiry is being made, but also this feature allows the voice recognition and response unit 302 to be programmed to provide, upon receipt of such an inquiry imminent signal, an output signal to speaker 308 causing the speaker to relay an instruction or acknowledgment message to the customer (e.g., the speaker states "Please state the name of the product that you wish to locate"). Notwithstanding these advantages, in alternate embodiments, this feature is unnecessary and no input button 306 need exist.

In addition to the above-described features, the preferred embodiment of the invention further includes one or more additional elements and/or features to achieve greater responsiveness with respect to the customer and greater accuracy in providing relevant information to customers. For example, in the preferred embodiment, a wider array of more user-friendly interactive verbal messages are sounded by the speaker during times in which users are making inquiries. Also, during times when no customer inquiries are being made, the system can be configured to provide general information that is of interest to customers. For example, a particular user interface can be configured to provide general information regarding the type of items that are located in the aisle in which the user interface is located, or to alert customers to particular products that are on sale.

Further, when no information is found regarding a particular product, database 310 of the central hub 330 is configured to identify products that are similar in name with respect to the requested product (or are similar with respect to some other characteristic of the requested product) and to provide that information to voice recognition and response unit 302, which in turn causes speaker 308 to sound a voice message suggesting that the customer inquire about another product (e.g., "I do not have any location information regarding the product you requested. However, are you interested in the location of product X?", where product X is a product determined by the central hub to be similar to the originally-requested product). If particularly sophisticated, database 310 will have information regarding products that are related to a requested product even when the database does not have information regarding the location of the requested product.

Indeed, the present invention envisions many alternate embodiments in which the interactions between the customer and user interface 320 take many, more complicated routes. For example, in certain embodiments, instead of merely recognizing product names stated by a customer, voice recognition and response unit 302 is sufficiently sophisticated to recognize diverse question types from a customer (e.g., the voice recognition and response unit is capable of responding to a customer inquiry concerning multiple products at once, such as "Where are the dairy products?" or "Where are cheese and crackers?"; or, the voice recognition and response unit is capable of responding to a customer inquiry regarding something other than the location of a product, e.g., "Where is the restroom?").

Also, the present invention envisions embodiments in which user interface 320 is capable of providing additional information (in addition to product location information) concerning products, such as price information or, if a product is not currently being sold, when the store will again be selling the particular product. All of this information can be provided, in such embodiments, from the same information source (e.g., database 310) as the product location information. To facilitate such more complicated interactions between user interface 320 and customers, these embodiments of the invention can include additional user input buttons in addition to input button 306, and also can include additional devices for providing information to customers (other than speaker 308), in verbal or non-verbal form.

Figure 4:
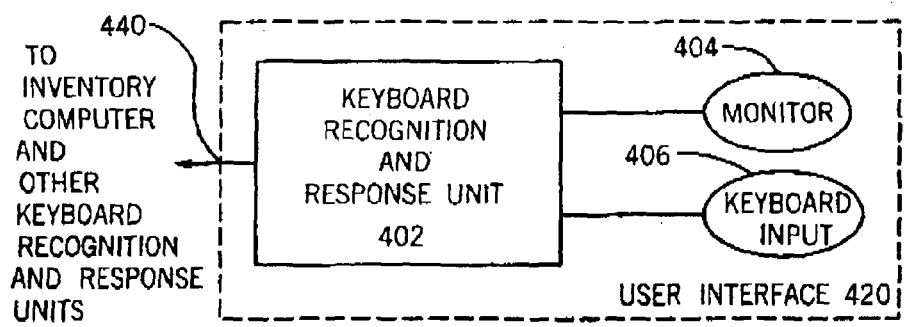
FIG. 4 is a block diagram showing elements of a second embodiment of the invention using an alternative communications technology to interface with persons desiring location information.

Turning now to FIG. 4, an alternate embodiment of the present invention is shown in which simpler input-output devices (other than voice recognition and response unit 302 for providing voice-recognition and speech synthesis) are employed to receive product location inquiries from customers and to provide information back to customers in response to their inquiries. Again, a user interface 420 is shown that is coupled by an electrical communication link 440 to a central hub (e.g., central hub 330), which typically is in turn coupled to at least one other user interface. In contrast to user interface 320 of the above-described preferred embodiment, user interface 420 includes a monitor 404 and a keyboard input 406 for respectively providing information to, and receiving inquiries from, customers.

Monitor 404 is a television screen, a liquid-crystal display or any other device for providing visual information to customers. Keyboard input 406 typically takes the form of a standard typewriter (QWERTY-type) keyboard, but in alternate embodiments has keys placed in another arrangement, or includes a greater number of or fewer keys than such a standard typewriter keyboard (other keyboards can have, for example, only a few alphanumeric, or merely numeric keys). In alternate embodiments, the respective output and input functioning of monitor 404 and keyboard input 406 are combined in a single unit, such as a touch screen display.

Monitor 404 and keyboard input 406 are coupled to, and are in communication with, a keyboard recognition and response unit 402. Keyboard recognition and response unit 402 in particular controls the output of monitor 404 and receives the signals from keyboard input 406 regarding customer inquiries. Keyboard recognition and response unit 402 is necessarily a less complicated device. (or at least requires less complicated programming and less memory) than voice recognition and response unit 302 insofar as the keyboard recognition and response unit does not have to perform voice recognition or speech synthesis.

Indeed, keyboard recognition and response unit 402 in certain embodiments simply operates to forward information from customers (input at keyboard input 406) to central hub 330 and also to control monitor 404 to display information received back from central hub 330. Typically, however, keyboard recognition and response unit 402 performs more complicated functionality (and requires more circuitry, memory or programming to perform this functionality), such as filtering out inappropriate requests from customers, correcting for spelling errors, or facilitating more complicated interactions with customers such as those described above with respect to user interface 320.

User interface 420 is not limited to monitor 404 and keyboard input. 406 for allowing input and output between the user interface and customers, and can further include additional devices to facilitate interaction with customers (for example, in one embodiment, "happy" musical tones are output via a speaker signifying whether product location information has been found in response to a customer's inquiry). Additionally, the present invention envisions hybrid user interfaces comprising components of the various embodiments already described. For example, in one embodiment, a user interface that is capable of speech synthesis, but not capable of voice recognition, is employed; such a user interface has a keyboard input in place of receiver 304. Finally, more than one type of user interface can be used in conjunction with one another, and/or be coupled to the same central hub (e.g., FIG. 3 could be modified to include user interface 420 of FIG. 4).

Also envisioned within the present invention are embodiments having the alternate configurations described above with respect to FIG. 1. For example, in contrast to FIG. 3, which shows a "hub and spokes" configuration with respect to the interconnection of central hub 330 and the multiple user interfaces (such as user interface 320 or user interface 420), each of the various user interfaces can instead be coupled serially to one another by communication link 340, which then at only one connection point couples those user interfaces to central hub 330. Also, instead of employing electrical communication link 340 to couple the various user interfaces and central hub, alternate devices can be utilized to allow communication (e.g., wireless communications).

Further, most communication with central hub 330 is eliminated in certain embodiments where one or more of the user interfaces are configured to be able to store and provide product location information (or other relevant information). Such user interfaces include additional memory and/or processing devices/capabilities in addition to (or within), for example, voice recognition and response unit 302 or keyboard recognition and response unit 402. In such embodiments, the user interface programmed with the product location information effectively becomes both a user interface and a central hub. In place of electrical communication link 340 coupling the user interfaces to central hub 330, another communication link (electrical or otherwise) is utilized to couple the user interfaces merely to one another. As stated above, a communication link 340 is dispensed with altogether if the user interfaces are programmed with all necessary product location information (and other relevant information) by a mobile programming device.

As discussed, certain embodiments of the present invention include one or more user interfaces (intermediary or otherwise) that perform database-related and other operations discussed above as being operations of the central hub. However, further envisioned within the present invention are embodiments where the central hub (or an intermediary user interface) is capable of performing some or all of the operations ascribed above to the user interfaces (particularly to the voice recognition and response unit and the keyboard recognition and response unit). For example, in certain embodiments of the present invention, voice recognition, speech synthesis, keyboard recognition and other processing operations (which in other embodiments are performed at user interfaces) are performed by the central hub.

In such embodiments, signals from receivers or keyboards, or to speakers or monitors, are transmitted directly to and from the central hub without any (or significant) signal processing at the user interfaces. For example, in one embodiment in which the user interfaces have only microphones (for receiving customer inputs) and television monitors or LCD screens (for outputting information to the customers), the only signal processing that occurs at the use interfaces themselves is the purely electromechanical conversion process performed by the receivers/microphones in converting voice signals to electrical signals for transmission to the central hub, and the electronic conversion process of converting the signals from the central hub into signals appropriate for controlling the monitors or LCD screens.

Figure 5:
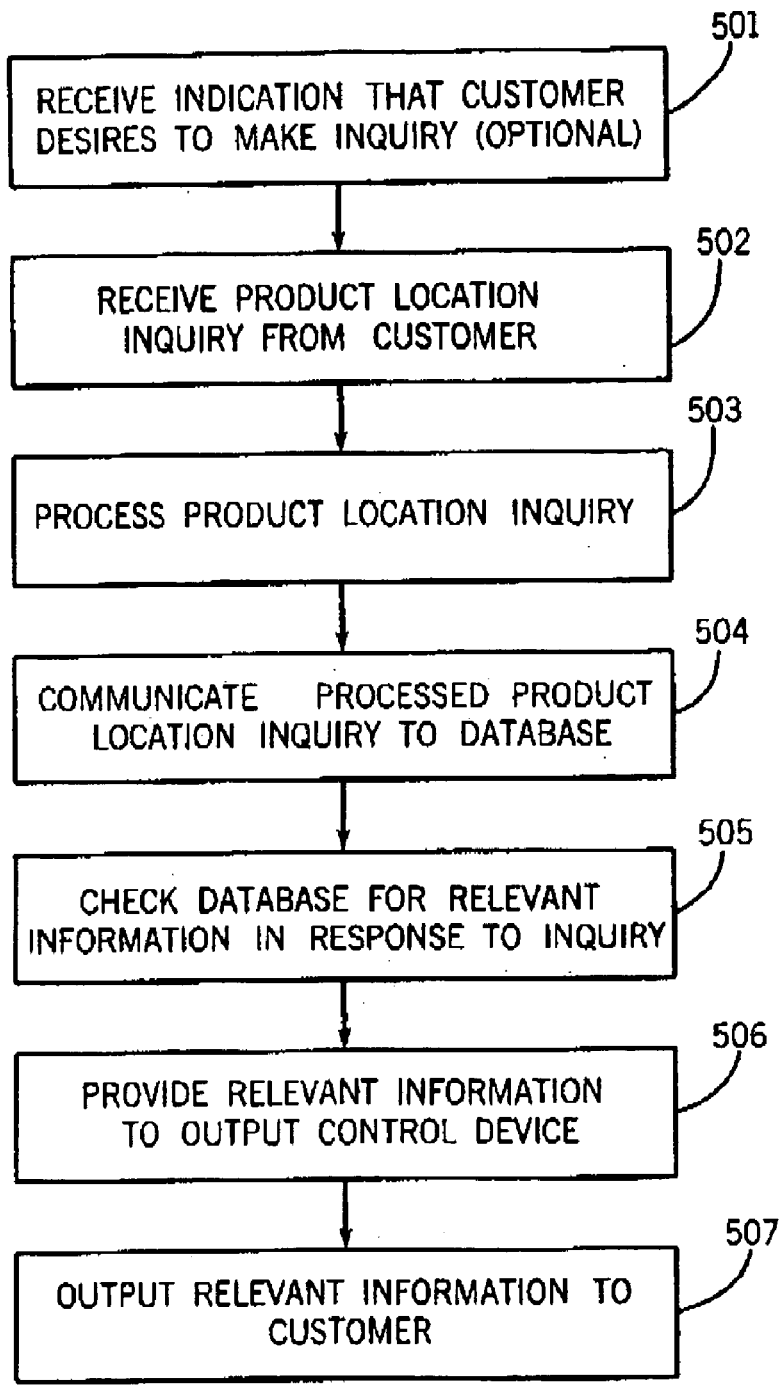
FIG. 5 is a flow chart showing exemplary steps performed by the present invention.

Referring to FIG. 5, exemplary operational steps for the present invention are shown in a flow chart. In step 501, an indication is received at the system from a customer which signifies that the customer desires to make a product location inquiry. In the preferred embodiment, this indication is received when the customer presses an input button (such as input button 306). However, a customer can also provide such an indication by providing a different signal via the same or a different device, and in certain embodiments performance of this step is not necessary at all.

In step 502, a product location inquiry from the customer is received by the system. The inquiry is received at a receiver, such as receiver 304, a keyboard input such as keyboard input 406, or at a different device such as a touch screen. A very simple inquiry may merely indicate an identity of a product for which the customer wishes to determine the location (e.g., the customer states "Cereal"). More complicated inquiries can include an indication that it is the location of the product that is desired (e.g., the customer inquires "Where is cereal?"). Additionally, other types of inquiries can also be made (regarding desired information other than product location) in more sophisticated embodiments of the invention. At step 503, the product location inquiry from the customer is processed by the system. In the preferred embodiment, involving voice recognition and response unit 302, such processing is involved, since voice-recognition processes must be applied to the signals from receiver 304.

In alternate embodiments, however, the processing is almost nonexistent. For example, in an embodiment having keyboard recognition and response unit 402, signals received from keyboard input 406 are merely converted into signals that can be sent directly to central hub 330 over communication link 440. In any event, all embodiments of the invention will require at least some minimal processing of customer inquiries, at least to insure that those inquiries were made in a format acceptable to the system and in a format capable of being communicated to the database (or other memory in which product location information is stored).

Next, at step 504, the processed product location inquiry is communicated to the database. Although in the preferred embodiment, this communication occurs by way of electrical communication link 340 between user interface 320 and central hub 330, the communication can occur in other ways as discussed above. For example, in certain alternate embodiments, the communication occurs solely internally within a single user interface (or even within a single microprocessor or other element of that user interface) when the product location information is stored within the user interface itself. Further, in additional alternate embodiments, the communication occurs between one user interface and a second (i.e., intermediate hub) user interface that has product location information, or within the central hub itself, if the central hub is configured to perform the processing of the product location inquiry of step 503.

In step 505, the database is checked for relevant information in response to the product location inquiry. In certain embodiments, the database is checked for other information (e.g., price information) as well. Methods for searching for information stored in such databases is well known in the art. At step 506, relevant information found from the database is provided back to an output control device. The output control device is in certain embodiments the same device that processes the product location information in step 503 (e.g., voice recognition and response unit 302). However, the output control device in alternate embodiments is separate from the device that processes the product location information.

The output control device in certain embodiments performs additional processing of the information signal from the database before that information is output to the customer. For example, in the preferred embodiment, voice recognition and response unit 302 converts the information signal into a voice-synthesized signal that produces voice sounds when provided to speaker 308. Finally, in step 507 the relevant information (and possibly additional information provided from the output control device) is output to the customer. The output is provided by way of speaker 308, monitor 404 or any one of a number of other types of output or input/output devices.

As described above, the present invention envisions multiple alternate embodiments that are capable of performing further steps in addition to those of FIG. 5 (or only some of those steps). For example, upon receipt and processing of a product location inquiry from a customer as in steps 501 and 502, the system in one embodiment performs additional interactive steps to obtain or provide further information or clarification regarding a product location inquiry vis-a-vis the customer before or while the system communicates an inquiry to the database. Also, in certain embodiments, the system not only provides information indicative of the locations of products in response to the inquiries of the customer, but also provides information as to how the customer can most effectively travel to those products within the store (e.g., provides directions as to how to get to a particular aisle).

In some embodiments, some or all of the information provided by the system is not only stated or displayed to a customer at a user interface, but also is printed out by a printer associated with the user interface. When an individual customer has made multiple inquiries, the information printed out for, or otherwise provided to, the customer is organized so that the customer can most efficiently travel to each of the desired product locations in as little time as possible. For example, the products and their respective locations are listed in order of closest proximity to the user interface. In certain embodiments, a map or the store (or a portion of the store) is printed out for the customer so that the customer is graphically informed of the location of the one or more products about which the customer has inquired. In one embodiment, the map has numbers on it at each of the locations of the desired products, where the numbers signify the order in which the customer should travel to the different locations.

The precise steps for controlling the input/output devices (or user interfaces), addressing and communicating with the database, and for processing information also vary significantly in different embodiments. For example, while the embodiment discussed above is capable of handling only one customer request at a particular user interface at a given time (although multiple customer requests can be handled simultaneously if the requests are made at multiple user interfaces), in certain embodiments, the system is capable of handling two or more inquiries at any given time at a single user interface. In one such embodiment, the system is capable of communicating a first product location inquiry to the database and simultaneously providing, in response to a second product location inquiry, a preliminary response to the customer without accessing the database. Also, in certain embodiments, the inquiries from the customer (and addressed by the system) extend beyond product location information.

The present invention is further meant to include further operations, and structures capable of performing those operations, that build upon the above-described features. For example, in further embodiments, the product location inquiries input by customers to the above-described system are stored and processed (i.e., tabulated and examined) to obtain information regarding customer preferences. The storage and processing of this information can be performed at the central hub or a user interface or at any of the other circuitry described above (or at additional circuits). By utilizing such information, stores can obtain useful information indicative of customer preferences or indicative of the relative difficulty customers are having in locating particular products within the stores. Such information can be used by store managers to identify fast-selling products or to determine whether the arrangement of products within the stores should be altered to better accommodate the needs of customers.

Further, the differences between the number of product location inquiries concerning certain products, and the number of those products actually sold by the store (which information is already typically monitored), can be calculated. Such information can be indicative of, for example, how customers' preferences change while the customers are within the store or how the preferences change once the customers learn of the prices of various products. Additionally, in particularly sophisticated embodiments of the present invention, customer typologies can be identified such that, upon receiving a particular set of product location inquiries from a given customer, the invention will automatically identify a customer profile and provide suggestions or information to the customer suited to that customer profile.

In additional embodiments, customer product location inquiry information is stored along with data concerning the identity of the individual customer himself, so that operation of the invention is tailored to the needs of the individual customer. By storing and monitoring the product location inquiry information, information regarding a particular customer's preferences can be obtained so that suggestions to the customer can be made (via a user interface) to that customer upon the customer's repeated visits to the store.

Further, in particularly sophisticated embodiments, an individual customer's standard purchases are already known (e.g., stored within the central database) when the customer enters the store. This information can be obtained based upon the customer's inquiries and purchases during earlier visits, or other actions by the customer, including survey responses, internet purchasing, etc. Thus, when the customer arrives and identifies himself to a user interface (e.g., by stating the customer's name to voice recognition and response unit 302), the user interface reminds or informs the customer of the location of certain items that are known to be of interest to the customer, or provides the customer with other information tailored to the needs of the customer. Further upon receiving customer identification, the system can provide signals to the store management (or to other devices) to provide specialized services to the customer (e.g., informing the customer of special sales going on at the store, or providing a handicapped customer with special assistance in shopping).

Further embodiments of the invention that include additional capabilities tailored to the needs of the individual customer are possible through the use of hand-held or otherwise mobile (preferably wireless) devices. Such devices can include, for example, telephone or walkie-talkie type units, headphones, specialized eyewear, etc. Upon entry of a customer into a store, the customer is provided with one of the user interfaces. After the customer provides identification to the user interface, the user interface begins to provide the customer with information regarding the locations of the customer's standard items of purchase (and any other items that are likely to be of interest to the customer).

In certain embodiments, the hand-held or otherwise mobile user interface is able to determine its own position within the store, using global positioning (GPS) or other position-sensing capabilities. Then, the user interface is able to provide directions to the customer as to how to travel to the customer's desired products within the store (as opposed to merely informing the customer of where the products should be located, by indicating an aisle, etc.). Such directions can be provided on a visual display on the user interface (e.g., showing a map of the store, showing the present position of the customer, and showing how to travel to desired products or to other desired destinations, using arrows or via other indications on the map). Instruction also can be provided verbally through voice response technology as discussed.

Alternately, assuming the customer desires to determine his own path through the store (e.g., the customer wishes to travel down each aisle of the store sequentially), the user interface can notify the customer each time the customer is about to pass an item of interest within the store. In one embodiment, an indication such as a light turns on in an aisle of a store as the user interface passes an item of interest.

The information provided to the customer in various embodiments can include not only product location information but also price information regarding products of interest, the total price of all products already selected by the customer (or a predicted total price of all products typically selected by the customer for purchase), or suggested alternate ways of obtaining desired products that are currently not available at the store (or letting the customer know when desired products will be available). For stores that are part of a larger network or franchise of outlets at different locations (e.g., Walgreen's) information regarding individual customers (or customer profiles or customers' behavior generally) can be shared among the different stores so that customers continue to receive individualized or other specialized treatment at each of the different stores within the network of stores (in certain embodiments, a particular central database can be shared among multiple stores).

Additionally, the present invention is configurable for providing information to customers that assists in the promotion of particular products. For example, in the absence of customer inquiries, the user interfaces can provide information regarding products that are being specially promoted, or products that are located close by to the user interfaces. If the user interfaces are included within the point of purchase displays, the user interfaces can be configured to attract the attention of customers who are passing the point of purchase displays. For example, user interfaces with speakers can announce to passing customers that "Product X is on sale— two for one dollar." User interfaces at the ends of particular store aisles can announce special products that are located within those aisles.

In addition in response to particular customer inquiries, the system is configurable to provide additional advertising or promotion information in addition to the location information requested by the customer. For example, the system, in response to an inquiry regarding the location of product Y, can respond by stating "Product Y is located in aisle 3. Product Z, which is on sale, is also located in aisle 3." Because of the many ways in which the system can be employed to promote or advertise different products, especially since the user interfaces are typically located in central or easily-accessed locations within the stores which are highly-frequented by customers, it is envisioned that store owners will be able to develop special arrangements with product manufacturers in which the product manufacturers will pay store owners to configure the system to promote products of the product manufacturers. Indeed, in certain circumstances, product manufacturers may wish to pay for the installation of the system within stores so that the system will promote their products.

While only a few exemplary embodiments of this invention have been discussed above, persons skilled in the art will recognize that many changes, substitutions and modifications (including omissions) are possible in these embodiments without materially departing from the novel features and advantages of this invention. It should be clear from the above discussion that the invention is capable of being employed in many different store-related environments, is capable of providing a variety of different types of information, and is further capable of having many different types of hardware and software configurations (including different types of interface devices and information-providing devices). Although suited for assisting customers, the invention can be used by others (e.g., store employees) who desire store-related information. The exact structure, design and operation of the invention can vary so long as the invention continues to accomplish the same functions.

In particular, the present invention is meant to encompass a variety of different systems and devices that are capable of receiving inquiries from store customers at one or more convenient locations, obtaining information in response to those inquiries from a centralized information source (or a limited number of such sources), and providing the information back to those store customers. By providing information from a centralized source, repeated interaction of store customers with other human beings (e.g., store employees) is reduced to a minimum (for example, only one store employee may be required to program the centralized information source with data that is then accessible repeatedly by many customers). Accordingly, all such changes, substitutions and modifications (including omissions) are intended to be included within the scope of the invention as defined in the following claims. Other changes, substitutions, and modifications (including omissions) may be made in the design, operation (and operating conditions) and arrangement of preferred and other embodiments without departing from the spirit of the invention as expressed in the following claims.

What is claimed is:

1. A system for providing product location information regarding locations of products within a store to customers within the store, the system comprising:
   a plurality of user interfaces situated respectively at respective positions within the store in a substantially stationary manner, the user interfaces configured to receive input signals from the customers in the store and provide output signals to the customers in the store, wherein each of the user interfaces includes a memory unit; and
   a hub that is at least indirectly in communication with each of the user interfaces, and that is capable of accessing at least one database, the at least one database including both product location information and additional store-related information,
   wherein the hub is periodically in communication with each of the user interfaces and provides portions of the product location information thereto, and
   wherein, upon receiving a first of the input signals representative of a product location inquiry from a first of the customers at a first of the user interfaces, the first user interface obtains relevant product location information from the respective memory unit of the first user interface, and subsequently the first user interface provides a first of the output signals as a response to the first input signal based upon the relevant product location information.

2. The system of claim 1, wherein the first user interface includes:
   a receiver configured to receive the first input signal, the first input signal being a voice signal,
   a speaker configured to provide the first output signal, the first output signal being a synthesized voice signal, and
   a voice recognition and response unit configured to process a receiver signal indicative of the first input signal and configured to provide a speaker signal from which the speaker generates the synthesized voice signal.

3. The system of claim 2, wherein the voice recognition and response unit includes a microprocessor programmed with voice recognition and voice synthesization software, and further includes an input button, wherein the first user interface is configured to receive the first input signal from the first customer only for a predetermined period of time after the input button has been triggered.

4. The system of claim 1, wherein each of the user interfaces is at least one of a stand-alone device and a device configured to be mounted on a structure within the store.

5. The system of claim 4, wherein the first user interface is configured to be at least one of fixed at an end of an aisle of the store, fixed near a middle of an aisle of the store, fixed within a point of purchase display of the store, fixed on a wall of the store, embedded within a shelving structure of the store, fixed near a checkout counter of the store, and suspended from a ceiling of the store.

6. The system of claim 1, wherein the first user interface includes a keyboard entry device configured to receive the first input signal, the input signal being a keying-in action,
a visual display unit configured to provide the first output signal, the first output signal being a visual output, and
a keyboard recognition and response unit configured to process a keyboard signal indicative of the first input signal and configured to provide a video signal from which the visual display unit generates the visual output.

7. The system of claim 6, wherein a second of the user interfaces includes:
a receiver configured to receive a second of the input signals, the second input signal being a voice signal,
a speaker configured to provide a second of the output signals, the second output signal being a synthesized voice signal, and
a voice recognition and response unit configured to process a receiver signal indicative of the second input signal and configured to provide a speaker signal from which the speaker generates the synthesized voice signal.

8. The system of claim 6, wherein the keyboard entry device and the visual display unit form a single touch screen input device, and wherein the first user interface further includes a printer which is configured to print out at least one of listings and maps.

9. The system of claim 1, wherein further comprising means for allowing communication between the hub and at least one of the plurality of user interfaces, and wherein the means for communicating includes at least one of a wired link and a wireless communications link.

10. The system of claim 1, wherein the hub is a mobile device capable of being physically transported to the respective positions of the respective user interfaces and being plugged into the user interfaces so as to allow communication between the hub and the user interfaces.

11. The system of claim 1, wherein the first user interface is incorporated as part of a point-of-purchase display within the store, and wherein the first user interface is also capable of providing at least one of price and promotional information concerning a product that was the subject of the product location inquiry.

12. The system of claim 1, wherein at least some of the product location information and additional product-related information stored within at least one of the respective memory units of the respective user interfaces and the at least one database is updated over time to reflect changes in inventory occurring within the store.

13. The system of claim 1, wherein the first user interface is also capable of providing a plurality of output signals that are indicative of at least one of the following: an indication of at least one type of product that is located in an aisle with which the first user interface is associated; further location information concerning where a general product category is located within the store; an indication of an alternative product to a first product to which the first input signal related; and an indication of how to proceed to a restroom within the store.

14. The system of claim 1, wherein the hub is in communication with other hubs located at other stores.

15. The system of claim 1, wherein the system keeps track of a difference regarding a first number of inquiries received relating to a first product and a second number of the first product that are actually sold at the store.

16. The system of claim 1, wherein the additional product-related information includes information regarding at least one of the following: information concerning a quantity of the product within the store; information concerning a price of the product; information concerning a presence or absence of the product within the store; information concerning a time at which the product should be available at the store if the product is currently absent from the store; information concerning a sale/promotion relating to the product; information concerning an alternate store at which the product may be available; and information linking one product with another product in a cross-referential manner.

17. A system for providing product location information regarding locations of products within a store to customers within the store, the system comprising:
a plurality of user interfaces situated respectively at respective positions within the store in a substantially stationary manner, the user interfaces configured to receive input signals from the customers in the store and provide output signals to the customers in the store, wherein each of the user interfaces includes a memory unit; and
a hub that is at least indirectly in communication with each of the user interfaces, and that is capable of accessing at least one database, the at least one database including both product location information and additional store-related information,
wherein the hub is periodically in communication with each of the user interfaces and provides portions of the product location information thereto,
wherein, upon receiving a first of the input signals representative of a product location inquiry from a first of the customers at a first of the user interfaces, the first user interface obtains relevant product location information from the respective memory unit of the first user interface, and subsequently the first user interface provides a first of the output signals as a response to the first input signal based upon the relevant product location information, and
wherein the first user interface is also capable of providing at least one of price and promotional information concerning a product that was the subject of the product location inquiry.

18. The system of claim 17, wherein at least some of the product location information and additional product-related information stored within at least one of the respective memory units of the respective user interfaces and the at least one database is updated over time to reflect changes in inventory occurring within the store.

19. A system for providing product location information regarding locations of products within a store to customers within the store, the system comprising:
a plurality of user interfaces situated respectively at respective positions within the store in a substantially stationary manner, the user interfaces configured to receive input signals from the customers in the store and provide output signals to the customers in the store, wherein each of the user interfaces includes a memory unit; and
a hub that is at least indirectly in communication with each of the user interfaces, and that is capable of accessing at least one database, the at least one database including both product location information and additional store-related information, wherein the hub is periodically in communication with each of the user interfaces and provides portions of the product location information thereto, wherein, upon receiving a first of the input signals representative of a product location inquiry from a first of the customers at a first of the user interfaces, the first user interface obtains relevant product location information from the respective memory unit of the first user interface, and subsequently the first user interface provides a first of the output signals as a response to the first input signal based upon the relevant product location information, and wherein at least some of the product location information and additional product-related information stored within at least one of the respective memory units of the respective user interfaces and the at least one database is updated over time to reflect changes in inventory occurring within the store.

20. The system of claim 19, wherein the first user interface is also capable of providing a plurality of output signals that are indicative of at least one of the following: an indication of at least one type of product that is located in an aisle with which the first user interface is associated; further location information concerning where a general product category is located within the store; an indication of an alternative product to a first product to which the first input signal related; and an indication of how to proceed to a restroom within the store; and wherein the additional product-related information includes information regarding at least one of the following: information concerning a quantity of the product within the store; information concerning a price of the product; information concerning a presence or absence of the product within the store; information concerning a time at which the product should be available at the store if the product is currently absent from the store; information concerning a sale/promotion relating to the product; information concerning an alternate store at which the product may be available; and information linking one product with another product in a cross-referential manner.

\* \* \* \* \*